United States Patent [19]
Asmis et al.

[11] Patent Number: 6,106,203
[45] Date of Patent: Aug. 22, 2000

[54] ELECTRODE TIP DRESSER WITH VACUUM

[75] Inventors: Nicholas A. Asmis, Parma; Charles R. Balog, Litchfield; Joseph P. Seme, Jr., Hudson, all of Ohio

[73] Assignee: Semtorq, Inc., Bedford, Ohio

[21] Appl. No.: 09/040,701

[22] Filed: Mar. 18, 1998

[51] Int. Cl.$^7$ ................................................. B23C 3/12
[52] U.S. Cl. ............................................ 409/137; 409/140
[58] Field of Search ................................... 409/137, 138, 409/139, 140, 175, 181; 407/42; 408/203.5, 211, 67; 219/119, 117.1

[56] References Cited

U.S. PATENT DOCUMENTS

| | | |
|---|---|---|
| 1,823,824 | 9/1931 | Dyas et al. . |
| 2,284,483 | 5/1942 | Whitesell, Jr. . |
| 2,286,931 | 6/1942 | Radeke . |
| 2,418,767 | 4/1947 | Hall ............................................. 90/12 |
| 2,434,750 | 1/1948 | Trecker et al. .......................... 409/137 |
| 2,638,817 | 5/1953 | Hall ............................................. 90/12 |
| 2,689,363 | 9/1954 | Frye .......................................... 121/45 |
| 2,930,289 | 3/1960 | Swarts .................................... 409/181 |
| 3,533,327 | 10/1970 | Hagerty ................................... 409/137 |
| 3,820,437 | 6/1974 | Dyer et al. ................................. 90/12 |
| 4,234,276 | 11/1980 | Meier, Jr. ............................... 408/104 |
| 4,578,005 | 3/1986 | Fuse et al. ............................... 409/140 |
| 4,610,153 | 9/1986 | Nedorezov ................................ 72/112 |
| 4,672,175 | 6/1987 | Niven .................................. 219/130.4 |
| 4,762,446 | 8/1988 | Nishiwaki ............................. 408/203.5 |
| 4,842,456 | 6/1989 | Saito ....................................... 409/140 |
| 4,856,949 | 8/1989 | Shimada ................................. 409/140 |
| 4,892,448 | 1/1990 | Hoch et al. ............................. 409/181 |
| 4,895,483 | 1/1990 | Anderson ............................... 409/137 |
| 4,896,014 | 1/1990 | Sakai et al. ............................ 219/91.2 |
| 4,921,377 | 5/1990 | Hoch et al. ............................. 409/140 |
| 4,957,148 | 9/1990 | Shoda ..................................... 409/137 |
| 4,966,504 | 10/1990 | Seme, Jr. et al. ...................... 409/140 |
| 4,966,506 | 10/1990 | Slanker .................................. 409/140 |
| 4,986,703 | 1/1991 | Hampl et al. .......................... 409/137 |
| 5,145,297 | 9/1992 | McGrath, Jr. .......................... 409/137 |
| 5,288,185 | 2/1994 | Mattson ................................. 409/181 |
| 5,304,769 | 4/1994 | Ikegami et al. ........................ 219/119 |
| 5,332,342 | 7/1994 | Kizaki et al. .......................... 409/140 |
| 5,401,127 | 3/1995 | Nakajima et al. ..................... 409/131 |
| 5,445,481 | 8/1995 | Nakajima et al. ..................... 409/140 |
| 5,545,872 | 8/1996 | Nakajima et al. ....................... 219/89 |
| 5,548,096 | 8/1996 | Akasaka et al. ..................... 219/117.1 |
| 5,630,682 | 5/1997 | Davey .................................... 409/137 |
| 5,651,519 | 7/1997 | Goodrich et al. ........................ 248/51 |
| 5,725,340 | 3/1998 | Nakajima et al. ..................... 409/140 |
| 5,882,155 | 3/1999 | Testa, Jr. ................................ 409/137 |

*Primary Examiner*—Daniel W. Howell
*Attorney, Agent, or Firm*—Calfee, Halter & Griswold LLP

[57] ABSTRACT

An electrode tip dresser includes a cutting tool to dress an electrode; the cutting tool having a cutter blade assembly with an opening through which passes material that is removed from an electrode; and a vacuum orifice disposed to catch the material near the tool opening.

14 Claims, 5 Drawing Sheets

ELECTRODE TIP DRESSER WITH VACUUM

BACKGROUND OF THE INVENTION

The invention relates generally to electrode tip dresser apparatus. More particularly, the invention relates to the provision of a vacuum source with a tip dresser to catch and remove chips and other debris from a dressing operation.

Electrode tip dressers are well known in the field of resistance welding or spot welding. After a number of welding operations, the welding gun electrodes typically become deformed. A typical phenomenon is known as mushrooming in which an electrode shape widens due to heat and residue. Such deformities, if left unattended, result in a significant deterioration in the ability to produce good welds. Thus, periodically, electrodes are dressed in order to return an electrode substantially to its original size and shape.

Electrode tip dressers are apparatus used to reshape welding electrodes. Automatic tip dressers can be stationary mounted or robot mounted. Stationary dressers are positioned in a suitable location on the welding shop floor or can be suspended or otherwise mounted above the floor. In either case, an electrode is presented to the dresser by the robot welder. Robot mounted dressers are mounted on a movable frame such that the dresser is presented to the electrode for dressing.

In either mounting arrangement for an electrode tip dresser, a typical welding operation such as can be found in an automotive assembly plant may include hundreds of welding electrodes that are periodically dressed throughout a shift time period. Each time an electrode is dressed, an amount of chips and other residue including powder usually are removed from the electrode and fall by gravity to the floor. This material is electrically conductive and can become a problem when a large number of electrodes are being dressed. The problems are exacerbated when the dressing operation is performed using an elevated dresser, because the material is free to float or fall down in any number of directions and on equipment in the area. With ever increasing emphasis on clean room production, such debris is undesirable The objectives exist, therefore, for techniques for removing chips and other debris produced during an electrode tip dressing operation.

SUMMARY OF THE INVENTION

The present invention contemplates, in one embodiment, an electrode tip dresser that includes a cutting tool to dress an electrode and having an opening through which passes material that is removed from an electrode; and a vacuum orifice disposed to catch the material.

These and other aspects and advantages of the present invention will be readily understood and appreciated by those skilled in the art from the following detailed description of the preferred embodiments with the best mode contemplated for practicing the invention in view of the accompanying drawings.

DETAILED DESCRIPTION OF THE INVENTION

Figure 1:
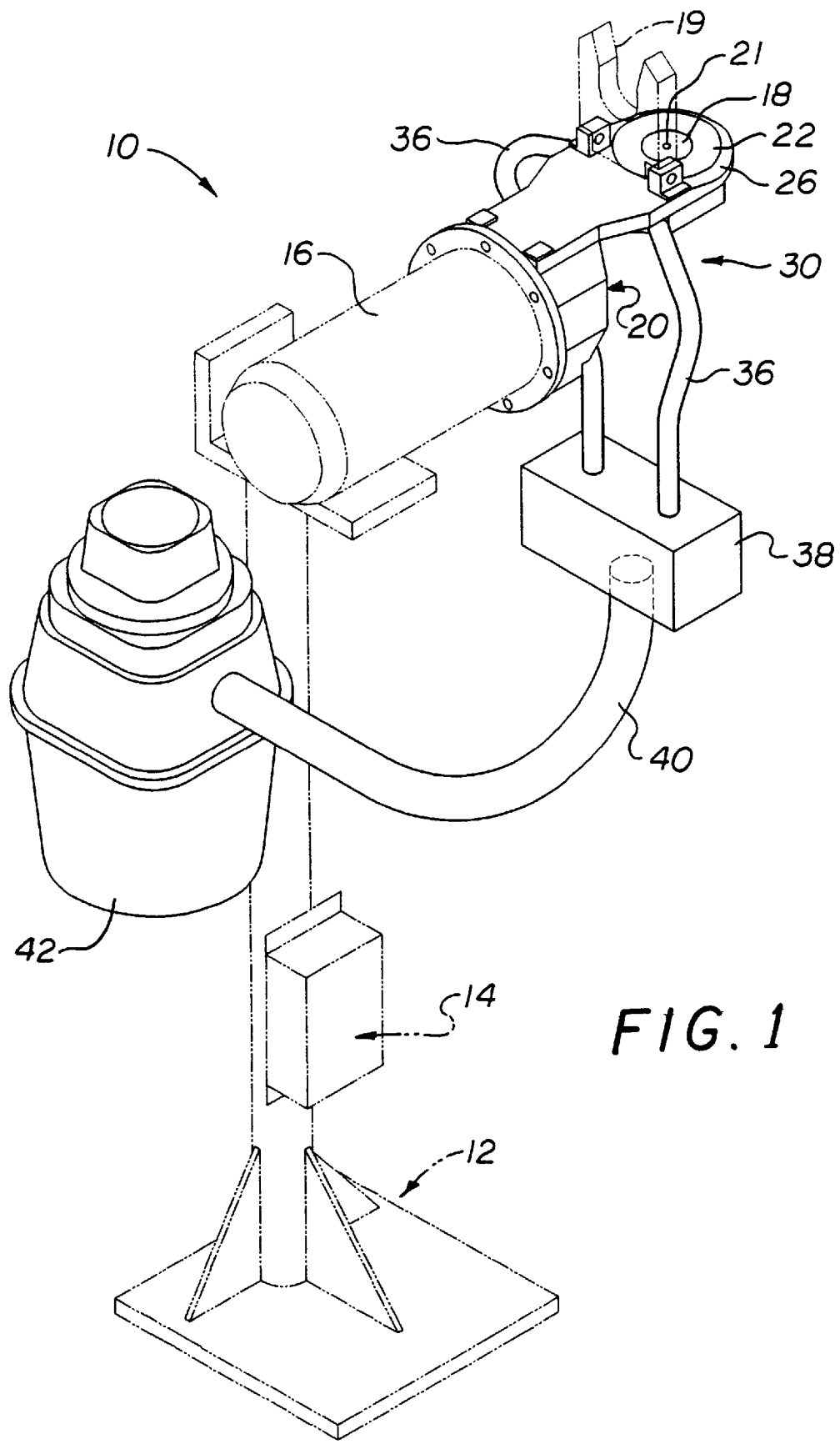
FIG. 1 is a perspective of an electrode tip dresser illustrated partially in phantom and that includes an embodiment of the present invention.

With reference to FIG. 1, an embodiment of the invention is illustrated with an electrode tip dresser 10. In this embodiment, the electrode tip dresser 10 is mounted on a stationary support frame 12, commonly referred to as a pedestal mounting. With this arrangement, an electrode (not shown) can be presented to the dresser 10 by a welding robot, for example. A typical tip dresser 10 includes an electrical power box 14 for providing shop power to the dresser, which may include any number of control circuits related to the control and operation of the dresser 10. The dresser 10 may further include an electric motor 16 that drives a rotatable cutter tool 18. A drive head 20 in the form of a casting is provided that houses appropriate drive gear and bearing apparatus and also serves as a support platform for the cutter tool 18 which is mounted on the body 20 with a tool holder 22. A flip-up guide 19 (shown in phantom in the UP position) can be used to secure the tool 18 and guide an electrode to a dress position. The rotatable cutter tool 18 and holder 22 can be, for example, of the type described in U.S. Pat. No. 4,996,504 issued to Seme, Jr. et al., the entire disclosure of which is fully incorporated herein by reference. The present invention is not limited, however, to any particular dresser design or configuration.

The cutting tool 18 includes a number of cutter blades which are arranged such that when the dressed electrodes are withdrawn from the tool 18 there is an opening 21 or area between the blades and the extension 26 through which chips, powder and other debris produced during a dressing operation can fall under the force of gravity away from the tool 18, the head casting 20 and the dresser 10 in general. The debris typically falls away after the dressed electrodes are withdrawn from the tool 18. As used herein, reference to "cutting" of an electrode during a dressing operation broadly includes forming and shaping an electrode by removal of material such as by cutting, abrasion or burnishing, for example. The residue produced can be chips, powder, flakes and combinations thereof, for example.

Figure 2:
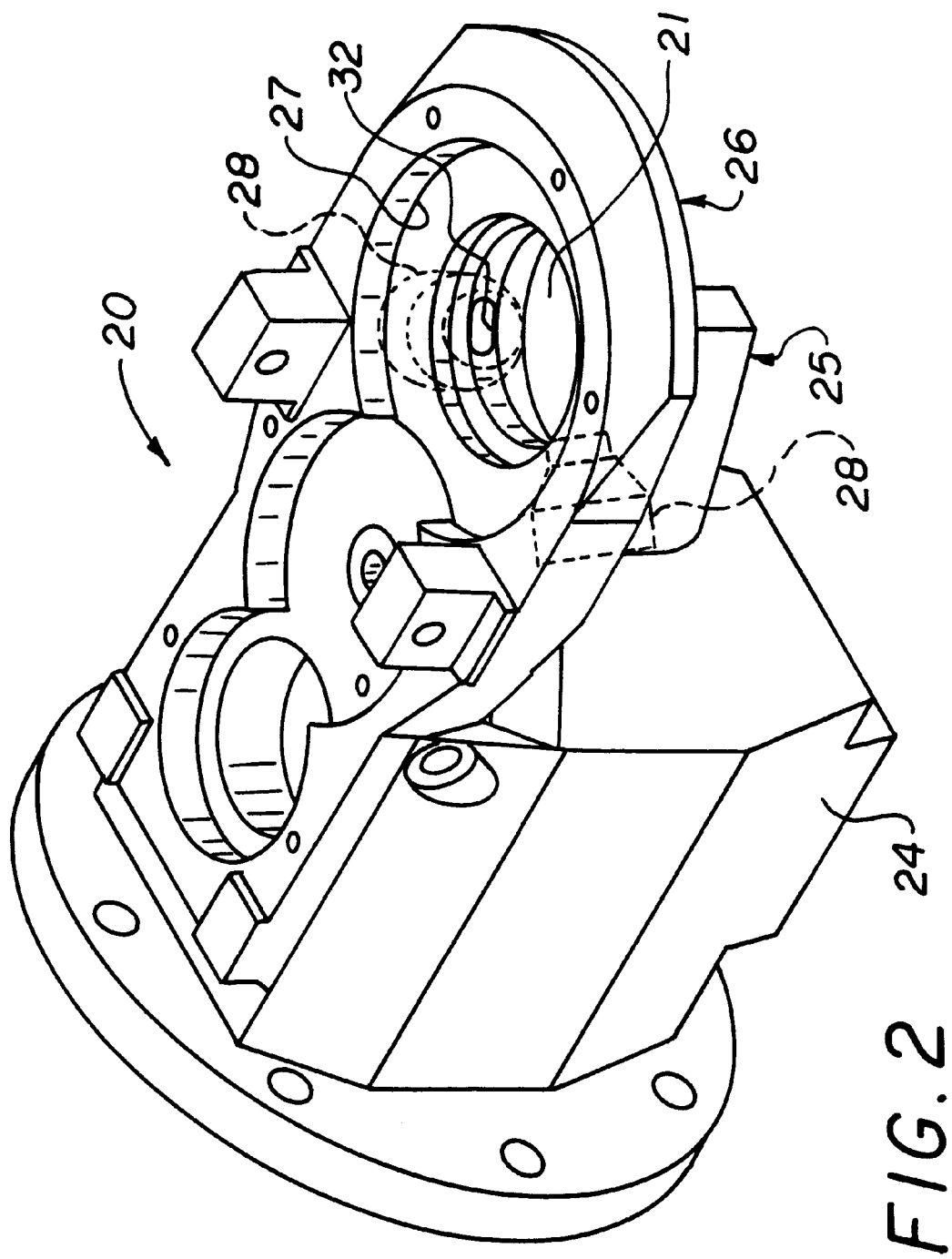
FIG. 2 is a forward perspective of a head body adapted to include a vacuum device in accordance with the invention.

With reference to FIG. 2, a more detailed illustration of the head casting 20 is provided. The head 20 may be, for example, a metal casting, and includes a main body 24 having an extension or platform 26. In this embodiment, the extension 26 is formed with a recess 27 that accepts the tool holder 22. In FIGS. 2–5 the tool 18 and tool holder 22 and guide 19 are omitted for clarity. Under the extension 26 is a second guide 25 that extends from the head 20 main body 24. This guide 25 serves to align a lower electrode for dual tip dressers, to permit access to the tool 18 from the underside, for example, in dresser designs that permit two electrodes to be dressed during the same dressing operation. Thus, as is apparent from FIG. 4, the guide 25 is formed with a forked structure which serves as a guide register to align an electrode with the cutter tool 18 when a robot presents the electrode for a dressing operation. The guide 25 can be integral with or separately attached to the tool extension 26.

Figure 3:
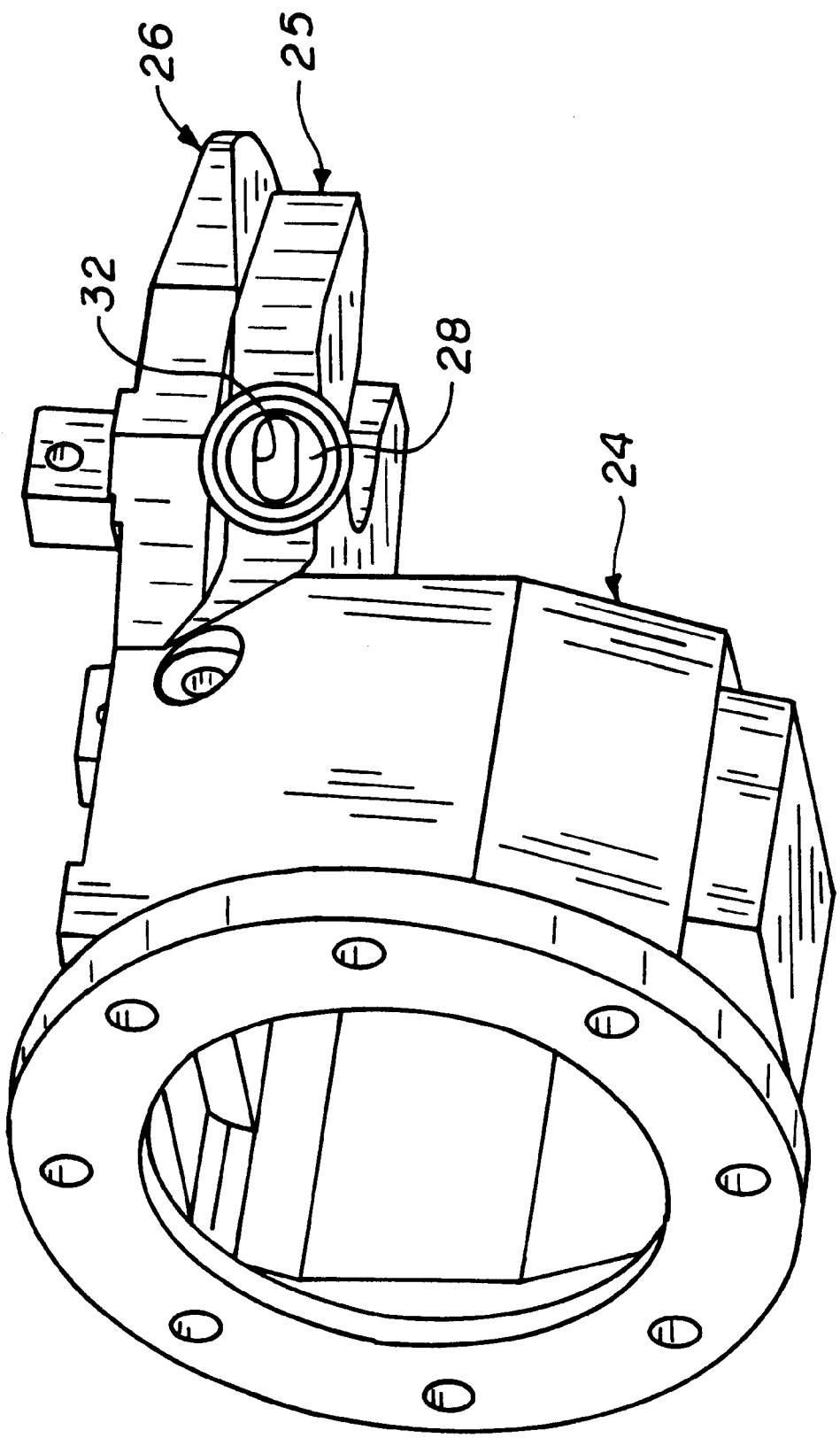
FIG. 3 is a rearward perspective of the head body of FIG. 2.
Figure 4:
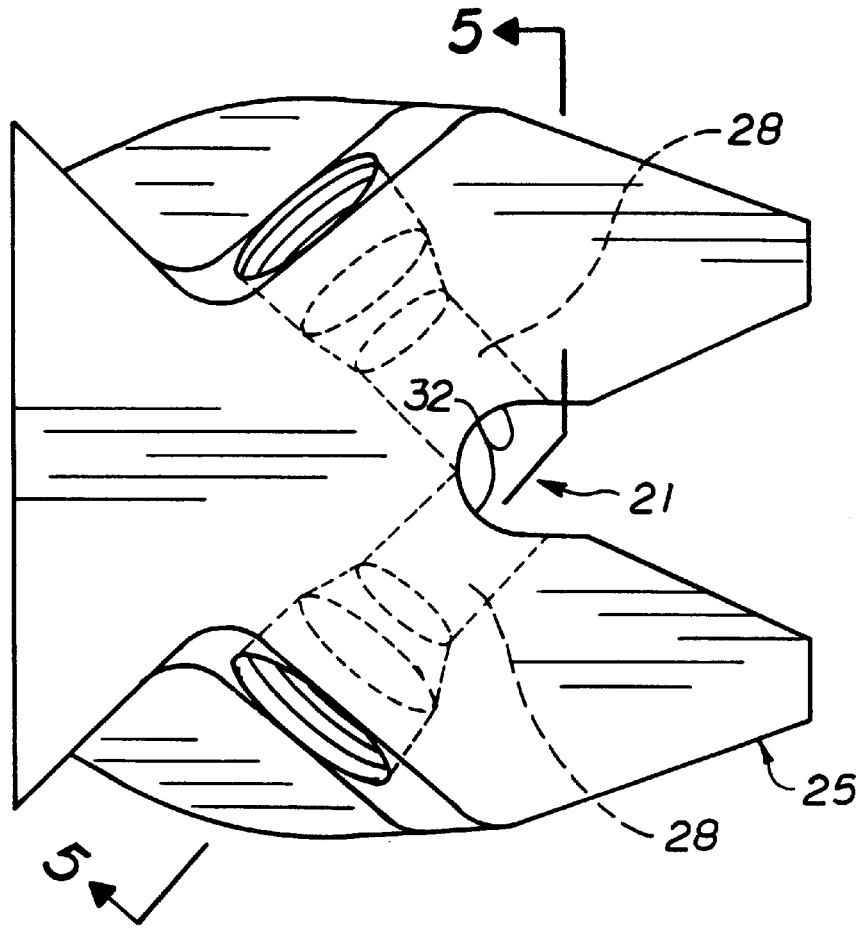
FIG. 4 is a bottom plan view of part of a head casting extension with vacuum ports therein that are part of the head body illustrated in FIGS. 2 and 3.
Figure 5:
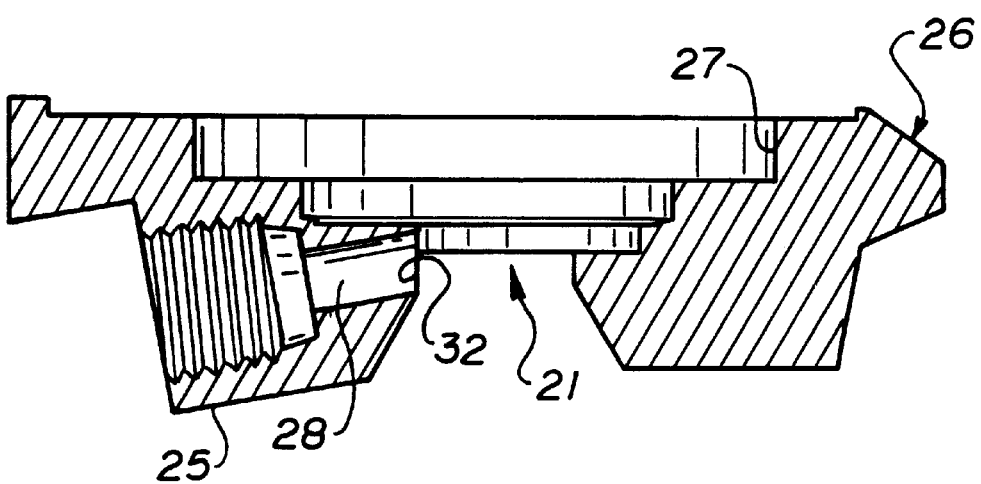
FIG. 5 shows the head casting extension of FIG. 4 in section along line 5–5 in FIG. 4, and particularly one of the vacuum ports.

With further reference to FIGS. 2, 3 and 4, the head 20, in this example more particularly the extension 26, is provided with two bores 28 there through. In accordance with one aspect of the invention, the bores 28, of which there will be at least one provided although two or more have been found to be more suitable in some applications, each form part of a vacuum line 30. Each bore 28 has an orifice 32 at an end proximate the cutting tool 18. In FIGS. 2, 4 and 5 the numeral 21 indicates the area through which debris passes near the orifices 32. In the embodiment of FIG. 2, each orifice 32 is elliptical in shape, although the particular shape selected may depend on the area required to capture the debris that falls from the tool 18 opening 21, the amount of room available for the orifice 32, and the distance of the orifice 32 from the cutting tool 18 opening 21. The bores 28 and their associated orifices 32 are formed in the head casting 20 so that the orifices 32 are positioned near the opening 21 through which passes the debris from a dressing operation. The distance of the orifices 32 from the opening 21 will depend on the vacuum level created at the orifices 32 and the overall casting design which has to allow electrodes to be inserted into the cutting tool 18.

The actual location of the bores 28 and their associated orifices 32 will depend on different factors for each dresser 10, including the shape and configuration of the cutter tool 18, particularly the blade design which will determine in part where the chips and debris will fall from, and the casting 20 configuration. The present invention can be realized, however, without having to provide the bores 28 in the head casting 20. The head extension 26 and bores 28 therein provide a convenient structure by which a vacuum orifice can be located near the cutter tool 18 to capture debris therefrom. In other applications, however, it may be more convenient to use other arrangements for disposing a vacuum orifice near the cutter tool 18. For example, a number of flexible vacuum hose lines could be mounted on the head 20 with the vacuum line ends disposed near the tool 18. As another example, a machined attachment could be provided with vacuum orifices similar to the arrangement of the orifices 32. The attachment could then be bolted or otherwise attached to the casting 24 to position the vacuum orifice(s) near the cutting tool 18. Other convenient alternatives will be apparent to those skilled in the art.

As illustrated in FIG. 5, the bores 28 can be formed at an angle relative to horizontal so that gravity facilitates the passage of the residue material through the bores 28.

With reference again to FIG. 1, each bore 28 is equipped at its outlet end 34 with a suitable fluid tight fitting (not shown) to which a secondary vacuum hose line 36 is connected to permit fluid communication between the hose 36 and its associated bore 28. Each hose 36 is connected at its opposite end, in this case, to a manifold 38 used to collect the chips and debris from all the vacuum lines for a particular dresser 10. A main vacuum hose 40 is connected from the manifold 38 to a vacuum source 42. In this embodiment, the vacuum source 42 is a stand alone, portable vacuum machine such as, for example, a SHOP-VAC® vacuum system. Alternatively, for example, the manifold 38 could be omitted, with the vacuum hoses 36 being T-connected and extended back to and directly connected to the vacuum source 42. Still another alternative could be to provide a venturi vacuum produced at an orifice by a high speed airstream adjacent the orifice. This venturi orifice would be positioned near the opening 21 to capture the debris from the cutting tool 18.

Any conveniently available vacuum pump or source can be used that provides a sufficient suction near the tool 18 to capture the desired amount of chips, powder and debris that falls from the dresser tool 18.

In a further alternative embodiment, the vacuum source 42 and dresser 10 can be mounted for movement on a robot arm (not shown) so that the dresser 10 can be presented to a welding gun electrode(s). The invention is useful with such robot mounted dresser embodiments, and especially elevated robot applications, by reducing the amount of chips, powder and other debris that falls from elevated locations of the dresser 10. The invention is similarly useful with elevated pedestal mounted dressers 10.

Figure 6:
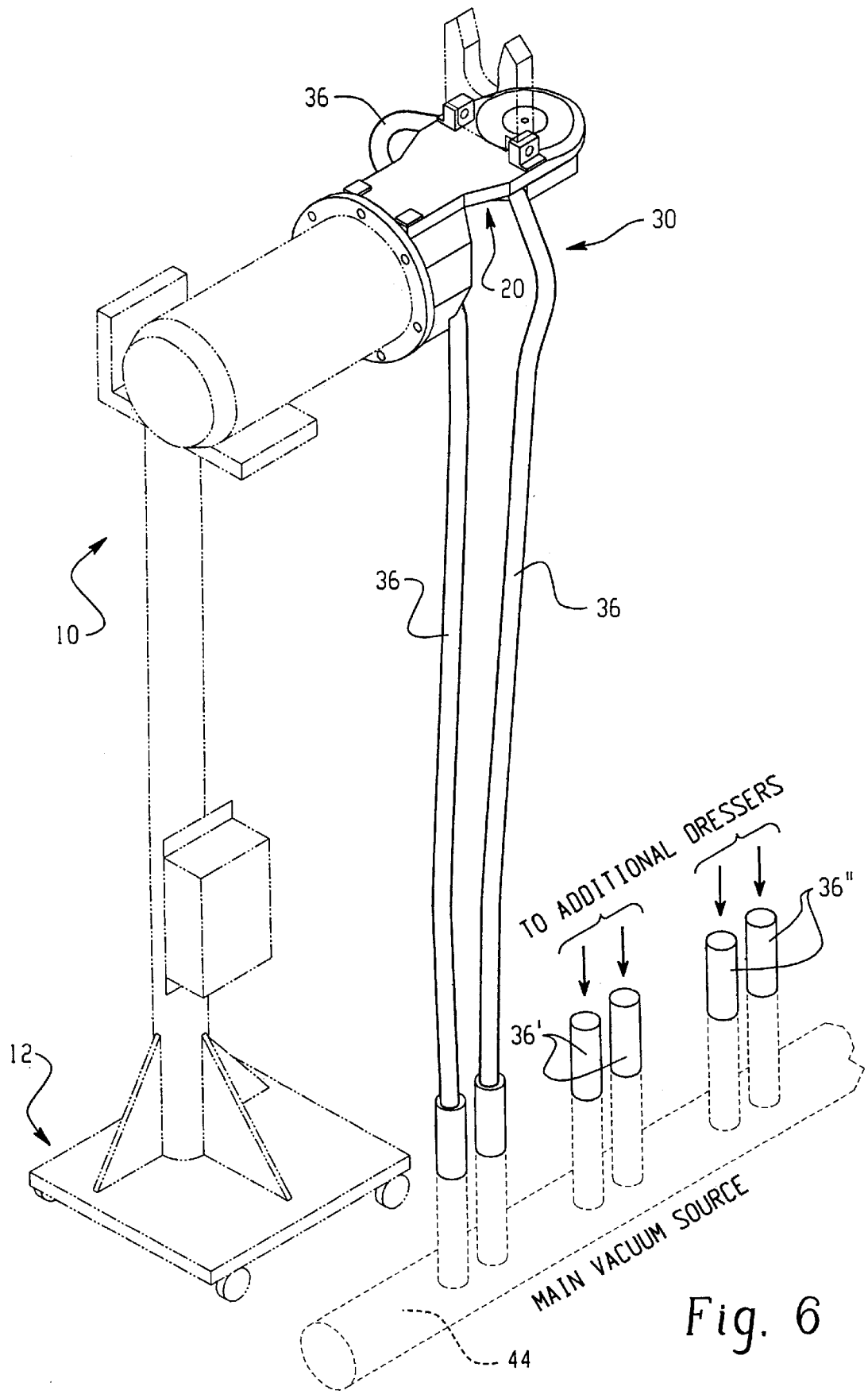
FIG. 6 illustrates an alternative embodiment by which the vacuum device is a distributed vacuum system.

FIG. 6 illustrates another embodiment of the invention. All the elements that are the same as the previous embodiments have the same reference designator numeral. In this example, however, the vacuum lines 36 extend from the head 20 and are connected to a main vacuum system 44, such as a wide area or shop vacuum system that is distributed throughout a manufacturing or welding facility. In the example of FIG. 6, the main vacuum system 44 is disposed below a shop floor. Other locations for a distributed vacuum system could be conveniently used. In this manner, a number of dressers 10 (not shown in FIG. 6) can be coupled to a distributed vacuum system 44 without needing to provide a separate vacuum source for each dresser 10. This is represented by a number of additional hose sets 36' and 36'' which would be connected to additional dressers in the shop.

While the invention has been shown and described with respect to specific embodiments thereof, this is for the purpose of illustration rather than limitation, and other variations and modifications of the specific embodiments herein shown and described will be apparent to those skilled in the art within the intended spirit and scope of the invention as set forth in the appended claims.

We claim:

1. An electrode tip dresser comprising: a tool to dress an electrode and a body to which said tool is disposed; said tool comprising a dress blade assembly with an opening through which passes material that is removed from an electrode;

said body having an extension thereof that supports said tool, with a portion of said extension being proximate said opening and at least one passageway that extends through said portion of said extension, said passageway having an orifice at a first end of said passageway near said opening;

and a vacuum device disposed to catch said material near said opening.

2. The apparatus of claim 1 wherein said tool dresses two electrodes during a single dressing operation.

3. The apparatus of claim 1 wherein said vacuum device comprises at least one vacuum line which is open at one end thereof near said opening so that material is drawn into said vacuum line as said material passes through said opening.

4. The apparatus of claim 3 wherein said vacuum line is in fluid communication with a portable vacuum source.

5. The apparatus of claim 4 comprising a stationary frame on which the tip dresser is mounted so that an electrode can be presented to the dresser, wherein said portable vacuum source is also mounted on said frame.

6. The apparatus of claim 4 comprising a movable frame on which the tip dresser is mounted so that the dresser can be presented to an electrode, wherein said portable vacuum source is also mounted on said movable frame.

7. The apparatus of claim 3 wherein said vacuum line is connectable to a distributed vacuum system.

8. The apparatus of claim 7 comprising a plurality of tip dressers with respective vacuum lines coupled to said distributed vacuum system.

9. A drive head for use in a electrode tip dresser comprising:

a body having a cutter tool mounted thereon;

said body having one or more internal passageways having a first end and a second end, with said first end being located proximate said cutting tool and said second end being connected to a vacuum line.

10. The apparatus of claim 1 wherein said orifice has an elliptical shape.

11. The apparatus of claim 1 wherein said vacuum device comprises a pair of vacuum lines each of which opens at one end thereof near said opening so that material is drawn into said vacuum lines as said material passes through said opening.

12. The apparatus of claim 11 wherein said vacuum lines are in fluid communication with a manifold connected to a vacuum pump.

13. The apparatus of claim 11 wherein said vacuum lines are connected to a distributed vacuum system.

14. The drive head of claim 9 wherein the first end of said passageway is elliptical.

* * * * *